(12) United States Patent
Stefener et al.

(10) Patent No.: US 7,435,505 B2
(45) Date of Patent: Oct. 14, 2008

(54) FUEL CELL COMBINATION

(75) Inventors: Manfred Stefener, München (DE); Jens Müller, München (DE)

(73) Assignee: SFC Smart Fuel Cell AG, Brunnthal-Nord (DE)

( * ) Notice: Subject to any disclaimer, the term of this patent is extended or adjusted under 35 U.S.C. 154(b) by 892 days.

(21) Appl. No.: 10/486,872

(22) PCT Filed: Aug. 12, 2002

(86) PCT No.: PCT/EP02/09020

§ 371 (c)(1),
(2), (4) Date: Aug. 12, 2004

(87) PCT Pub. No.: WO03/017406

PCT Pub. Date: Feb. 27, 2003

(65) Prior Publication Data

US 2005/0069757 A1    Mar. 31, 2005

(30) Foreign Application Priority Data

Aug. 14, 2001    (EP) .................................. 01119549

(51) Int. Cl.
*H01M 8/08* (2006.01)
(52) U.S. Cl. .......................................... 429/46; 429/14
(58) Field of Classification Search .................. 429/14, 429/17, 30, 46
See application file for complete search history.

(56) References Cited

U.S. PATENT DOCUMENTS

| 3,143,440 | A |  | 8/1964  | Hunger et al. |
| 5,846,669 | A | * | 12/1998 | Smotkin et al. ............... 429/41 |
| 2002/0187375 | A1 |  | 12/2002 | Baldauf et al. |
| 2003/0049509 | A1 |  | 3/2003  | Divisek |

FOREIGN PATENT DOCUMENTS

| DE | 38 00 484 A1 | 7/1989 |
| DE | 199 30 877 A1 | 1/2001 |
| EP | 1 020 942 | 4/1998 |
| WO | WO 01/61776 A1 | 8/2001 |

* cited by examiner

*Primary Examiner*—Patrick Ryan
*Assistant Examiner*—Muhammad Siddiquee
(74) *Attorney, Agent, or Firm*—IP Strategies (57) ABSTRACT

The invention refers to a fuel cell device comprising an electrolyte device, which comprises an alkaline electrolyte means and an acid electrolyte means, wherein the fuel cell device is formed such that at least part of at last one reaction product produced at the electrolyte means can be supplied to the other electrolyte means. Moreover, the invention comprises a method of operating a fuel cell device, which includes the following steps: providing an alkaline electrolyte means and an acid electrolyte means, supplying at least one fuel and at least one oxidant, discharging reaction products, wherein at least part of at least one reaction product produced at an electrolyte means is supplied to the other electrolyte means.

19 Claims, 5 Drawing Sheets

FUEL CELL COMBINATION

FIELD OF THE INVENTION

The invention generally refers to a fuel cell device with an alkaline electrolyte means and an acid electrolyte means, wherein a reaction product of the one electrolyte means can be supplied to the other electrolyte means. The invention particularly refers to a fuel cell device in which the above-mentioned reaction product is $H_2O$.

BACKGROUND OF THE INVENTION

Fuel cells convert energy that is stored in the molecular bonds of chemical compounds directly into electrical energy. This "cold combustion" differs from the conventional ("hot") combustion in that the dissociation reactions and reactions of formation on which the energy conversion (redox reaction) is based are carried out spatially separated, and the conversion of the chemical energy into electrical energy is carried out not indirectly by heat generation and conversion of the heat energy into mechanical work.

In the case of a fuel cell, which uses methanol ($CH_3OH$) as a fuel, said methanol being combusted to carbon dioxide and water, the following balance equation can be defined for the conversion of substances proceeding in the fuel cell—independent of the actually proceeding reaction steps:

$$CH_3OH + 1.5 O_2 \rightarrow CO_2 + 2H_2O (+\Delta G).$$

The useful electrical energy of the fuel cell is given by the Gibbs' enthalpy $\Delta G$ of this reaction and amongst others depends on the operating temperature of the fuel cell.

The structure of a fuel cell consists of an anode-sided chamber and a cathode-sided chamber, which are separated from one another by an ion-conducting (liquid or solid) electrolyte. In the anode-sided chamber the (usually hydrogen-containing) fuel is supplied, whereas the reaction substance, usually oxygen, is supplied to the cathode-sided chamber.

Furthermore, reaction products (combustion products), e.g. water and/or carbon dioxide are generated in the fuel cell, which must possibly be discharged partially or fully.

A general distinction is made between acid electrolytes (e.g. sulphuric acid, phosphoric acid) through which positive ions travel from anode to cathode, and alkaline electrolytes (e.g. caustic potash), through which negative ions travel from cathode to anode.

In a fuel cell that uses methanol as a fuel and which has an acid electrolyte, e.g. a proton-conducting membrane, the following anode and cathode reactions can be given:

| Anode: | $CH_3OH + H_2O$ | -> | $CO_2 + 6H^+ + 6e^-$ |
| Cathode: | $1.5 O_2 + 6H^+ + 6e^-$ | -> | $3H_2O$ |

It can be recognized that $H_2O$ in the fuel cell is not only produced as a combustion product and must be discharged on the cathode side, but that $H_2O$ together with the actual fuel methanol must also be supplied at the anode side (which cannot be derived from the balance equation).

Since at the cathode more water as is produced as combustion product than must be supplied at the anode, a respective part of this water produced as waste product can at least theoretically be returned to the anode during operation so that the necessity of an external water supply can be avoided.

This water return is, however, connected with several technical problems:

- the amount of water that must be supplied at the anode differs from the amount that accumulates at the cathode;
- the water accumulating at the cathode usually exists in a different state of aggregation (gaseous) than is needed at the anode (liquid);
- the water accumulating at the cathode does usually not exist in pure form but is "polluted" by other combustion products (e.g. carbon dioxide),
- the above-mentioned anode and cathode equations are net equations and are a strong simplification of the actual process: in reality, each diffusing proton encloses itself in a hydrate shell and thereby draws a parasitic portion of water from the anode through the electrolyte to the cathode; a more realistic anode equation therefore reads as follows:

$$CH_3OH + (1+x)H_2O \rightarrow CO_2 + 6H^+ + 6e^- + xH_2O,$$

wherein the value of x depends on the operating parameters, particularly the temperature.

It must be emphasized that the parameter x must in no case be neglected ($x \ll 1$) but that, on the contrary, water of $x > 1$ and in the scale of $10^0 \ldots 10^1$ comes far more closer to reality than the net balance equation ($x = 0$). In the case of a realistic hydrate shell of 1 to 6 water molecules per proton, x adopts the values 6 to 18.

In order to elucidate which substance quantities must actually be supplied at the anode and cathode, it is useful to define the balance equation in the following (unabridged) form:

$$[CH_3OH + (1+x)H_2O] + 1.5 O_2 \rightarrow CO_2 + (3+x)H_2O,$$

wherein in order to maintain operation, the substance mixture defined in the square brackets $[CH_3OH + (1+x)H_2O]$ must permanently be supplied at the anode side.

Similar problems also occur with a fuel cell with alkaline electrolytes. For a DMFC (direct methanol fuel cell) with a hydroxide ion conducting polymer membrane, the following anode and cathode reactions can for instance be defined:

| Cathode: | $1.5 O_2 + 3H_2O + 6e^-$ | -> | $6OH^-$ |
| Anode: | $CH_3OH + 6OH^-$ | -> | $CO_2 + 5H_2O + 6e^-$ |

In this case, water does not only develop as a combustion product but it must also be supplied on the cathode side. A return is amongst others aggravated by the fact that the water at the anode side is a water/methanol mixture whose separation is technically very complex. Furthermore, the hydroxide anion, similar to the proton, is enclosed in a hydrate shell so that it is also useful in order to explain the consequences resulting therefrom to state the balance equation in unabridged form:

$$CH_3OH + [1.5 O_2 + (3+y)H_2O] \rightarrow CO_2 + (5+y)H_2O.$$

To maintain operation, the substance mixture $[1.5 O_2 + (3+y)H_2O]$ stated in square brackets must proportionately be supplied on the cathode side, wherein the water need $(3+y) H_2O$ can in principle be covered by the greater water quantity $(5+y)H_2O$ produced at the anode, but the technical realization of the proportional water return is, as mentioned, connected with great technical difficulties.

Due to this general tendency of ions diffused through an ion-conducting electrolyte, described above by means of examples, to surround itself with a hydrate shell and to draw this hydrate shell through the electrolyte (electroosmosis), comparable effects also occur in fuel cells which use a fuel different than methanol.

Thus, a general problem aggravating the structure as well as the operation of fuel cell systems is that substances produced on one side as a reaction product—be this as a result of parasitic transport through the electrolyte (electroosmosis) or as a result of a chemical reaction or a combination thereof— are needed on the other side, wherein a simple return of these reaction products is confronted with various technical problems.

Brief Summary of the Invention

Thus, it is an object of the invention to provide methods and fuel cell devices which overcome these problems.

These objects are solved according to the invention by fuel cell devices comprising the features defined in claim 1 and by the method defined in claim 10.

Consequently, a fuel cell device according to the invention comprises an electrolyte device, which comprises an alkaline electrolyte means and an acid electrolyte means, wherein the fuel cell device is formed such that at least part of at least one reaction product, which is produced at an electrolyte means, may be supplied to the other electrolyte means.

The method of operating a fuel cell device according to the invention comprises the following steps: providing an alkaline electrolyte means and an acid electrolyte means, supplying fuel and oxidants, discharging reaction products, wherein at least part of at least one reaction product, produced at an electrolyte means, is supplied to the other electrolyte means.

Particularly if the two electrolyte means are operated with the same fuel it is possible, as a result of the partially complementary properties of acid and alkaline electrolytes, to supply a substance produced at an electrolyte device at the anode side as a reaction product without complex separation to the other electrolyte device at the anode side, and/or to supply a substance produced at an electrolyte device at the cathode side to the other electrolyte device at the cathode side.

In a preferred embodiment, at least one reaction product produced at an electrolyte means may fully be supplied to the other electrolyte means.

Thus, a further device for the disposal of this at least one reaction product must not be provided for this reaction product at the one electrolyte device, which enables a simpler design and a simplified operation of the fuel cell device.

A simple design of a fuel cell device according to the invention comprises an alkaline electrolyte means, which is formed by one single anion-conducting portion, and an acid electrolyte means, which is formed by one single cation-conducting portion. Further advantageous embodiments of fuel cell devices are not restricted to such a single portion.

Preferred embodiments of fuel cell devices comprise an acid electrolyte means with a plurality of cation-conducting portions and/or an alkaline electrolyte means with a plurality of anion-conducting portions.

Thus, arrangements are possible, in which reaction products alternatively repeatedly pass through the alkaline and the acid electrolyte means, which enables a more complete utilization of these substances and thus an effective operation of the fuel cell device.

In an especially preferred embodiment of the fuel cell device according to the invention, the anion-conducting portions and the cation-conducting portions are arranged alternately.

The alternating arrangement of the portions may be along a direction (one-dimensional arrangement) and for instance form strip patterns. These portions may all have the same dimension, however, they can also change in the pass-through direction.

In other preferred embodiments the alternating arrangement is implemented simultaneously in two directions. Preferred two-dimensional arrangements with equally great portions comprise: chequerboard pattern, rhombic pattern, triangular pattern, hexagonal pattern. In the case of a two-dimensional arrangement of differently large portions, there is an arbitrary number of possibilities. These arrangements are optimized in view of a possibly complete combustion of the supplied fuels and utilization of the reaction products produced.

In an especially advantageous development of the fuel cell device, the cathode device of the fuel cell device comprises one single cathode chamber and/or the anode device of the fuel cell device comprises one single anode chamber.

This allows an especially simple and effective control of the substance flow, since at least partially common means for fuel supply, oxidant supply and waste material disposal can be used.

An electrolyte device formed as a coherent structure but which has a locally differing chemical composition is especially advantageous, wherein portions of different chemical composition form the cation-conducting portions (i.e. the acid electrolyte means) and the anion-conducting portions (i.e. the alkaline electrolyte means).

The electrolyte device of the fuel cell device preferably comprises an ion-conducting membrane. It is particularly comparatively simple to manufacture membranes with a locally different chemical composition, which form anion or cation-conducting portions, whereby the electrolyte device of the fuel cell device can be formed as one single coherent membrane.

The following description of the invention by means of preferred embodiments and with respect to the Figures is made with the example of methanol as fuel-using fuel cells, it is, however, not restricted thereto.

For a better understanding of the invention and the problems on which it is based, the unabridged reaction equations with the example of methanol-using fuel cells are not summarized:

Fuel cells with acid electrolytes:

In the overall equation, the substances to be supplied are on the left-hand side, the reaction products to be discharged are on the right-hand side.

The square brackets represent the substances to be supplied and discharged at the anode side and the curly brackets represent the substances to be supplied and discharged at the cathode side.

Fuel cells with alkaline electrolytes:

In the overall equation, the square brackets also represent the substances to be supplied and discharged at the anode side and the curly brackets represent the substances to be supplied and discharged at the cathode side.

DETAILED DESCRIPTION OF THE INVENTION

Figure 1:
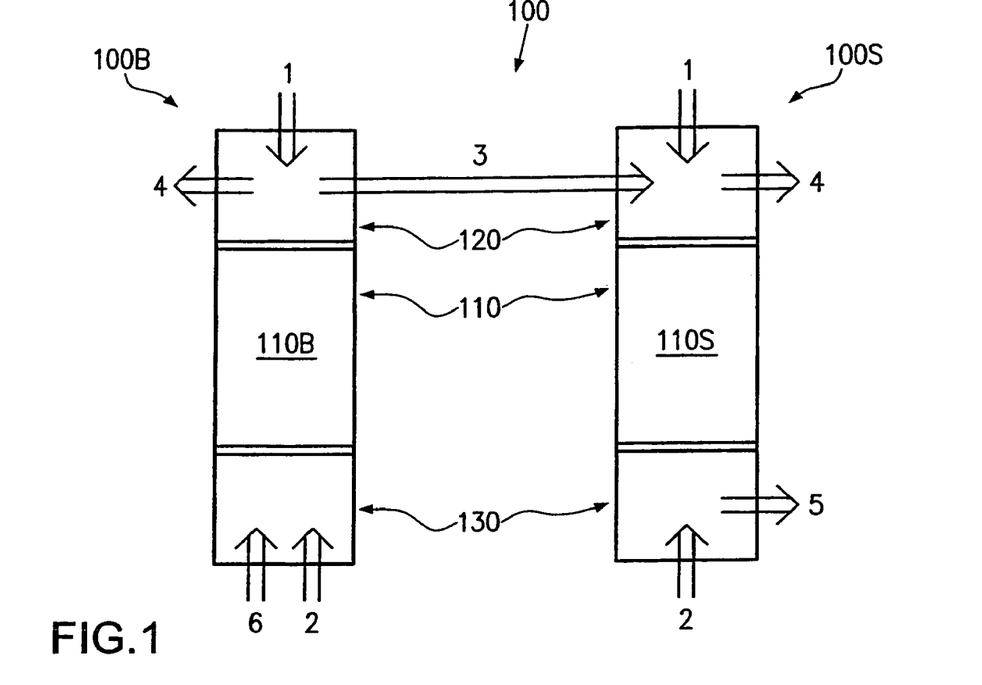
FIG. 1 shows a first embodiment of the fuel cell device according to the invention.

FIG. 1 describes a fuel cell device 100 according to the invention, which is composed of a combination of two substantially parallel fuel cells 100B and 100S. One of these two fuel cells has an alkaline electrolyte 110B, the second one has an acid electrolyte 110S.

The fuel cells 100B, 100S are only shown schematically. Each of the two fuel cells may for instance be formed as a fuel cell stack.

The two electrolytes 110B, 110S form the electrolyte device 110 of the combined fuel cell device 100.

In both fuel cells 100B, 100S, the fuel 1 identical for both fuel cells is supplied at the respective anode chamber, and the same oxidant 2 is supplied at the cathode chambers 130. Furthermore, the combustion product 4 is discharged from the cathode chambers.

In the case of the present example, the fuel 1 is methanol and the oxidant 2 is oxygen, e.g. an oxygen-containing gas mixture such as air. The combustion product 4 is carbon dioxide.

Furthermore, the alkaline electrolyte means 110B must be supplied at the cathode side besides the oxidant 2, i.e. oxygen according to the above-mentioned cathode equation, with a certain amount of water 6 which is required for the process of the reactions in the fuel cell. At the same time also exits at the anode-side: partially new as a result of the chemical processes partially by diffusion through the electrolyte. Without distinguishing these processes, the expression "reaction product" is used for this.

According to the invention, the two fuel cells 100S and 100B are combined to form a fuel cell device 100 in that the anode-sided emerging reaction product 3 (in this case water) of the anode chamber 120 is supplied to the acid fuel cell 100S.

In the anode chamber 120 of the acid fuel cell 100S it forms methanol 1 together with the simultaneously supplied fuel, which leads to the anode-sided methanol/water mixture required for the operation of an acid electrolyte means.

Since the anode chambers 120 of the two fuel cells 100S and 100B have the same substances (in this example: methanol, carbon dioxide, water), the reaction product 3 transferred from one anode chamber into the other anode chamber must not be subjected to complex purification procedures. Rather, the reaction product 3 (water) may be "polluted" by other substances, i.e. the fuel 1 (methanol) and the combustion product 4 (carbon dioxide) without the function of the device being affected.

In the acid fuel cell the discharge of the excess water 5 produced in the overall process takes place at the cathode side besides the supply of oxidants 2 (oxygen).

The embodiment according to the invention of FIG. 1 has the advantage compared to a water return from the anode chamber into the cathode chamber (or vice versa) of a conventional fuel cell, that a complex substance separation must not be carried out.

In the present example, the substances methanol 1, water 3 and carbon dioxide 4 are in the anode chamber 120 of the alkaline fuel cell. The same substances exist in the acid fuel cell, wherein contrary to the alkaline fuel cell, water is not produced as a reaction product but is rather needed for reaching the desired reaction.

Thus, the water from the anode chamber of the alkaline fuel cell transferable into the anode chamber of the acid fuel cell without a purification having to be carried out in order to eliminate undesired substances.

Figure 2:
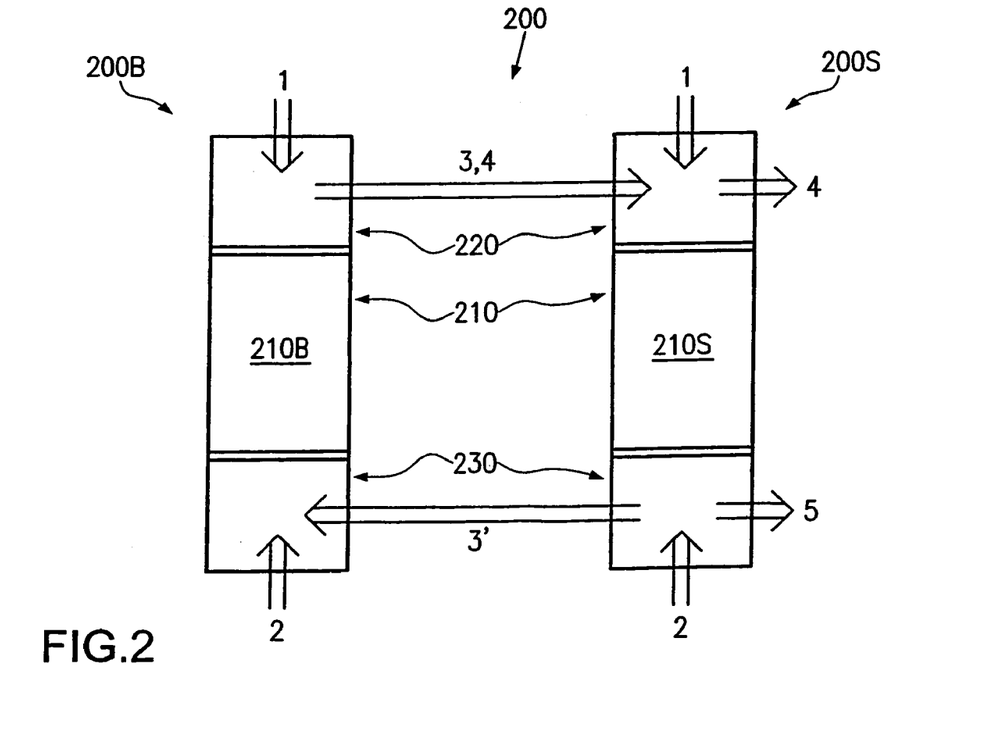
FIG. 2 shows a second embodiment of the fuel cell device according to the invention.

FIG. 2 shows a further embodiment of a fuel cell device 200 according to the invention, which consists of a combination of an alkaline fuel cell and an acid fuel cell.

Contrary to the embodiment shown in FIG. 1, the fuel cell combination now described does not have an external water supply. Rather, a part 3' of the water produced in the "acid fuel cell" 200S at the cathode side 230 is transferred into the cathode chamber 230 of the "alkaline fuel cell" 200B. The oxygen/water mixture needed for forming the hydroxide anions is generated in this chamber 230 by supplying oxygen 2.

As introductorily mentioned, the hydroxide anions diffuse through the alkaline electrolytes 210B, wherein they enclose themselves in a hydrate shell. The water 3 transported by this process into the anode chamber is now transported together with the water 3 and carbon dioxide 4 produced during the actual combustion into the anode chamber 220 of the acid fuel cell 200S. The carbon dioxide 4 is for instance withdrawn from the further transport and reaction processes by external discharge, while the water 3 together with the supplied fuel 1 results in the water/methanol mixture needed for operating the acid fuel cell 200S.

In the acid fuel cell 200S the same reactions as already described in connection with FIG. 1 take place, wherein the water transported into the cathode chamber 220 remains partially 3' in the cycle and the excessive part 5 is removed from the system.

Figure 3:
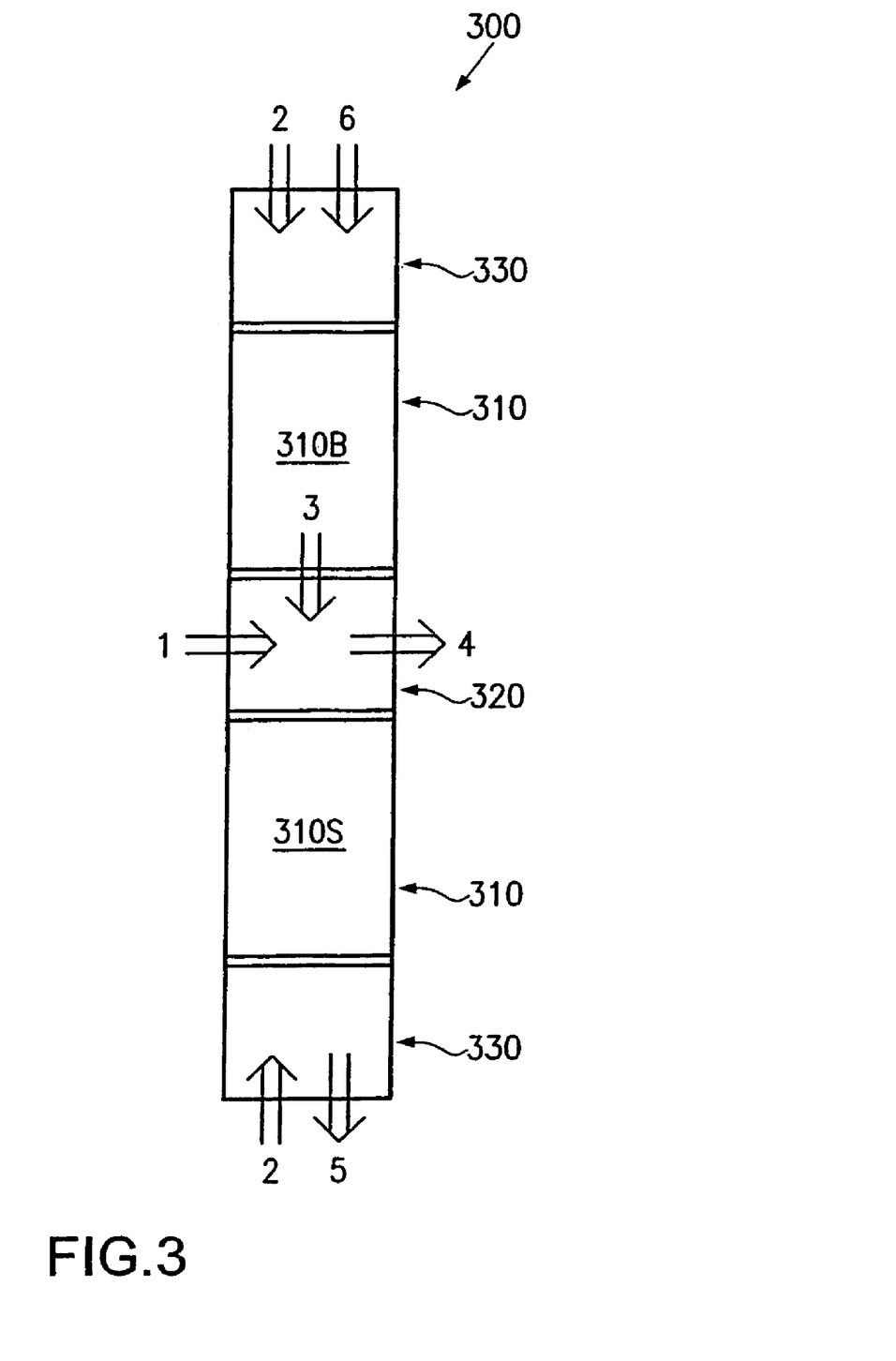
FIG. 3 shows a third embodiment of the fuel cell device according to the invention.

FIG. 3 shows a further embodiment of the fuel cell device 300 according to the invention, which, contrary to the embodiments shown in FIG. 1 and 2, is no longer composed of two more or less separately operative fuel cells.

The embodiment of FIG. 3 rather comprises a fuel cell device 300, which comprises an alkaline electrolyte means 310B and an acid electrolyte means 310S, which comprise a common anode chamber 320.

At the cathode side 330 of the alkaline electrolyte means 310B, an oxygen/water mixture designated by reference numerals 2 and 6 is supplied into the cathode chamber 230. At the same time, pure methanol is supplied to the anode chamber 320.

Thus, the processes described several times take place in the alkaline electrolyte means 310B, in which methanol 1 with oxygen 2 is "combusted" to carbon dioxide 4 and water 3, and additional amount of water 3 is drawn through the alkaline electrolyte 110B from the cathode chamber 330 into the anode chamber 320.

Due to the mutual anode chamber 320 it is not necessary to externally supply water to the anode chamber. Rather, the methanol/water mixture produced in the anode chamber 320 may be used to subsequently operate the acid electrolyte means 310S if oxygen is supplied at the cathode side 330 of the acid electrolyte means 310S.

The excessive water 5 produced in the total process is discharged from the cathode chamber 330 of the acid electrolyte means 310S.

Figure 4:
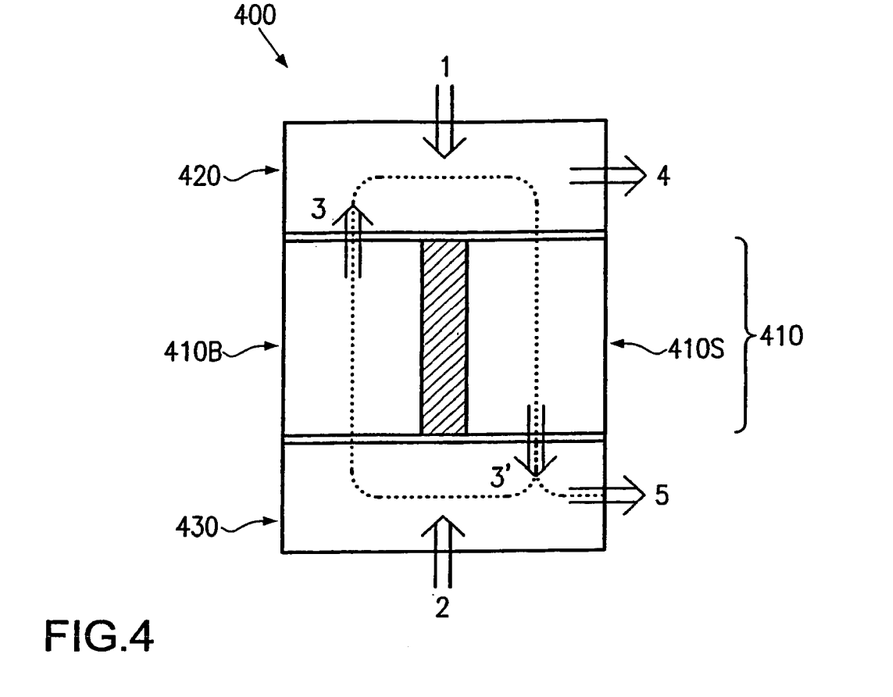
FIG. 4 shows a fourth embodiment of the fuel cell device according to the invention.

A further embodiment according to the invention is shown in FIG. 4. In this case, the electrolyte device 410 comprises two electrolyte means 410S, 410B provided side by side, wherein one electrolyte means 410B has an alkaline character and the other electrolyte means 410S has an acid character.

The fuel cell device 400 is formed in a manner that the two electrolyte means 410B and 410S each have a common cathode chamber 430 and a common anode chamber 420. Thus, only one supply device for fuel 1 and one supply device for oxygen 2 is needed.

The water 3 produced during operation at the alkaline electrolyte means 410B on the anode side forms a methanol/water mixture together with the methanol 1 supplied at the anode side, said methanol/water mixture being useable for the combustion process at the acid electrolyte means 410S.

In a similar manner, part of the water 3' produced in the acid electrolyte means 410S on the cathode side may form the cathode-sided water/oxygen mixture needed for operating the alkaline fuel cell device. The excess water 5 is discharged on the cathode side.

Figure 5:
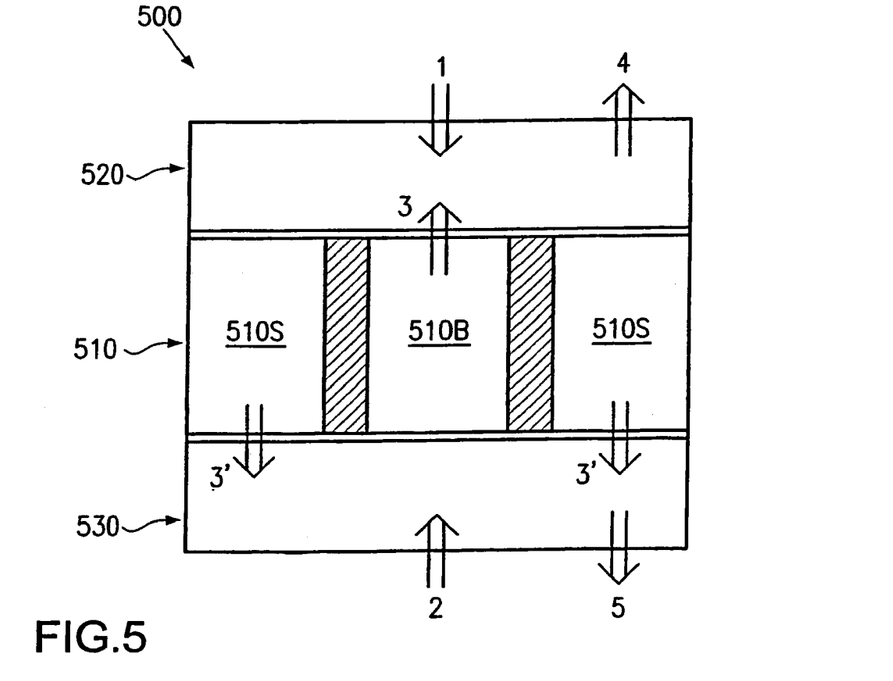
FIG. 5 shows a fifth embodiment of the fuel cell device according to the invention.

FIG. 5 shows an embodiment similar to FIG. 4, wherein one of the two electrolyte means 510S, 510B, namely the acid electrolyte means 510S comprises two portions separate from one another between which the alkaline electrolyte means 510B is provided. This embodiment is operated similar as the embodiment described in FIG. 4:

Water 3 is produced on the anode side at the centrally provided alkaline electrolyte means 510B, said water 3 enriching the methanol 1 supplied at the anode chamber 520 and forming an anode-sided methanol/water mixture needed for operation of the acid electrolyte means 510S. In a similar manner, the cathode-sided water emerging at the acid electrolyte means 510S mixes with the oxygen 2 supplied at the cathode side, and for this purpose it forms the cathode-sided water/oxygen mixture needed for the alkaline electrolyte means 510B.

Excessive water is again discharged on the cathode side.

Figure 6:
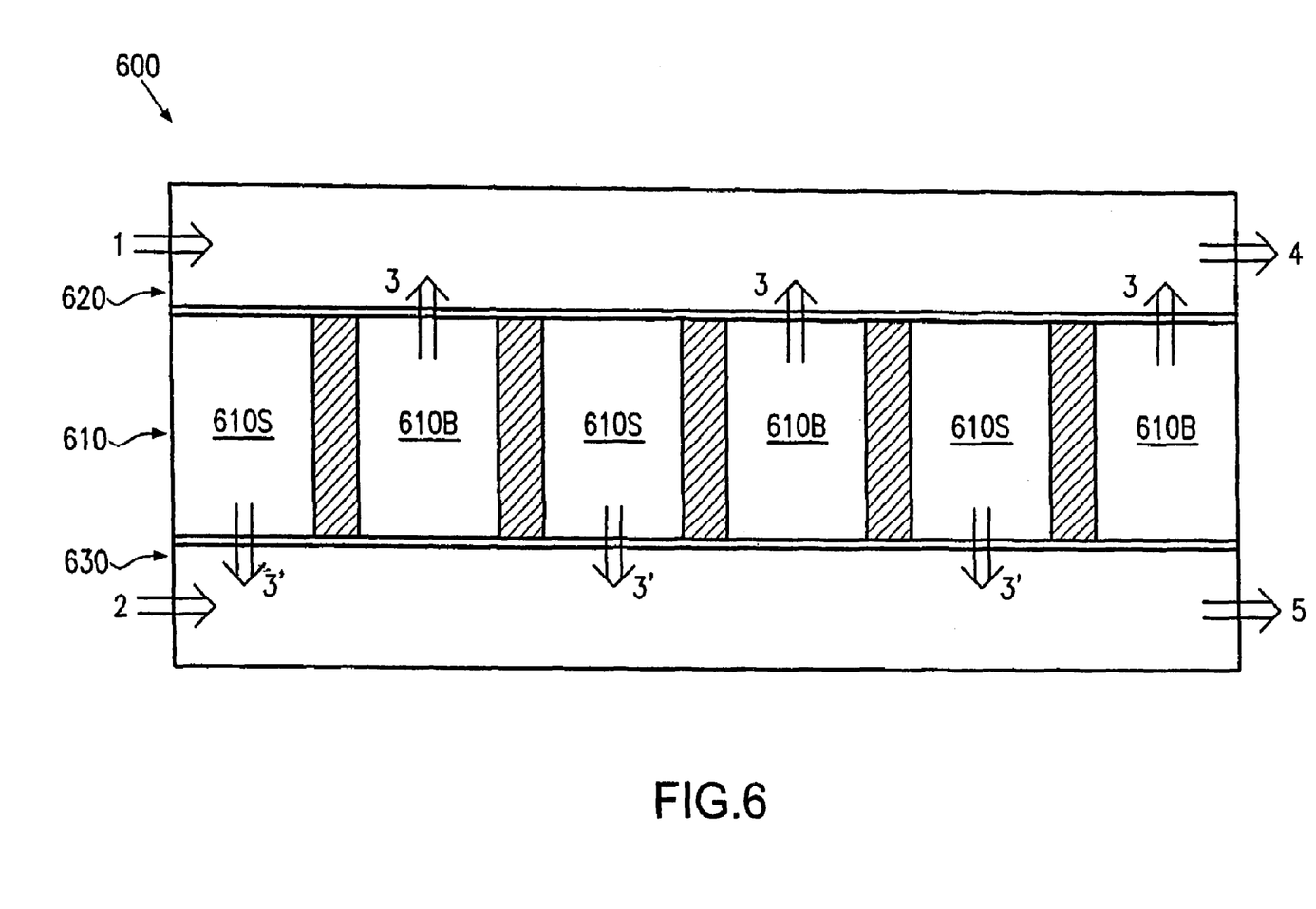
FIG. 6 shows a sixth embodiment of the fuel cell device according to the invention.

FIG. 6 shows a further preferred embodiment of the fuel cell device 600 according to the invention, which comprises a plurality of electrolyte means 610S and 610B arranged alternatingly. This alternatingly arranged portions form the electrolyte device 610 of the fuel cell device 600, which comprises one single, common anode chamber 620 and one single cathode chamber 630.

In the present example, the arrangement is such that the fuel 1 is supplied on an input side of the common anode chamber 620 and flows by the anode sides of the successively arranged electrolyte means 610S, 610B. In a similar manner, oxygen 2 is introduced at a side of the cathode chamber 630.

At each of the acid or alkaline electrolyte portions, a part of the methanol 1 combusts on the anode side to form carbon dioxide 4. Moreover, water 3 is produced through the alkaline electrolyte portions 610B. The methanol/water mixture produced therefrom may be used for operating the adjoining acid electrolyte portions 610S.

A similar process takes place on the cathode side with the flowing oxygen 2, which is enriched with water 3' at the acid electrolyte portions 610S, wherein the oxygen/water mixture produced may be used for operating the adjoining alkaline electrolyte portions 610B.

A methanol depletion takes place in the anode chamber 620 in the flow direction, wherein an oxygen depletion of the present oxygen/water mixture takes place on the cathode side.

This may be taken into consideration when dimensioning the successive alkaline and acid electrolyte means, which is usually carried out in such a selected way that an optimal yield is produced.

The embodiment of FIG. 6 comprises single elements of the electrolyte means which are separated from one another. In contrast thereto, FIG. 7 shows an alternative and especially preferred embodiment of an electrolyte means 710, which may replace the electrolyte means 610 in the embodiment of FIG. 6.

Figure 7:
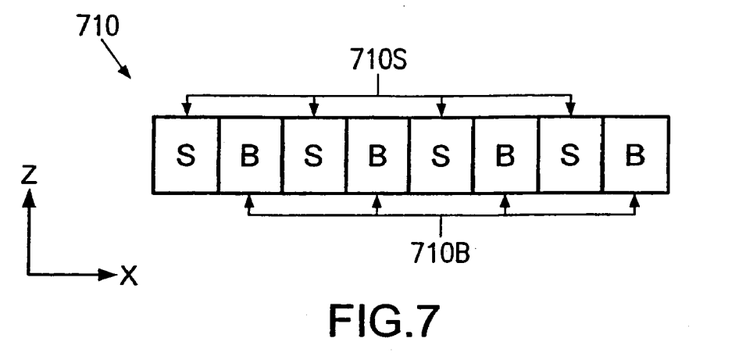
FIG. 7 shows a preferred embodiment of an electrolyte device for the fuel cell device according to the invention.

In the electrolyte means 710 of FIG. 7 electrolyte means that can be isolated from one another do not exist, but a coherent structure with locally different chemical composition. The composition was chosen such that portions with cation conduction and portions with anion conduction alternate so that an electrolyte means 710 results, in which acid portions S and alkaline portions B alternate.

Figure 8:
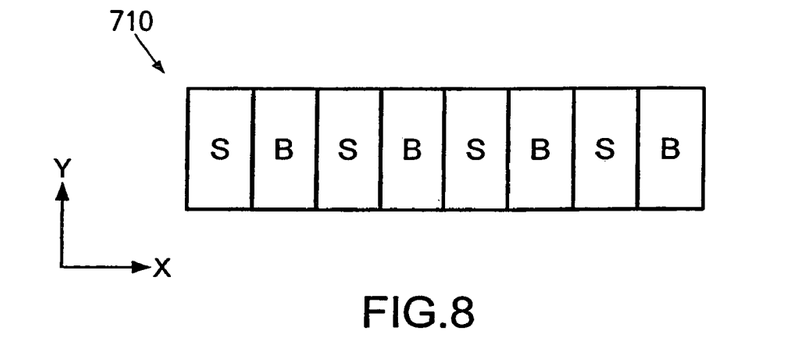
FIG. 8 shows the embodiment of the electrolyte device shown in FIG. 7 from an another perspective.

As shown in FIG. 8, such an alternating arrangement may extend along a direction, e.g. along the x-axis. The dimension of the portions is freely selectable and not restricted to the example schematically shown with portions being approximately equally large.

Figure 9:
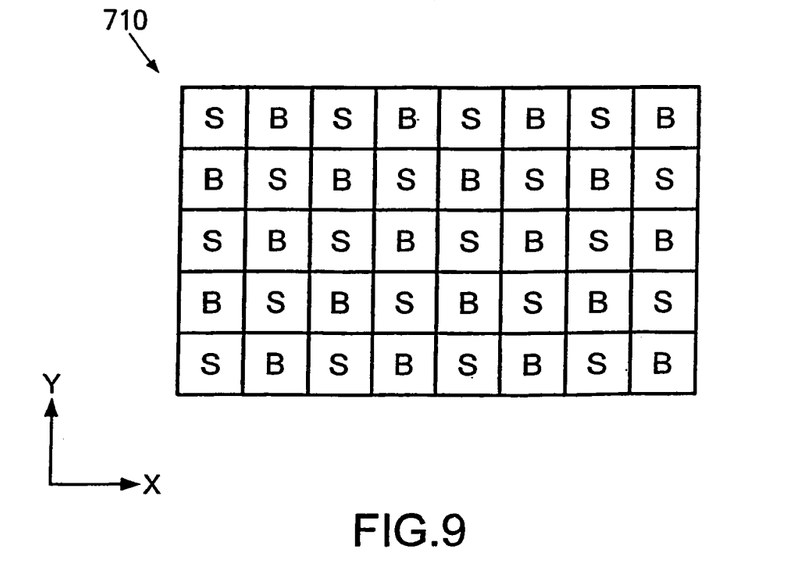
FIG. 9 shows a further preferred embodiment for an electrolyte device.

In an advantageous embodiment, which is shown in FIG. 9, the alternating arrangement can also be along two spatial directions and for instance result in a chequerboard pattern. Other two-dimensional arrangements, such as triangular patterns or irregular patterns also belong to the scope of this invention.

The arrangement of patterns of this type and the size of the individual portions are selected consistent with the flow relations to be expected in the fuel cell device.

In all described embodiments, the alkaline and acid electrolyte means may be dimensioned differently large with respect to the substance quantities converted therein amongst others since water is produced in the system (e.g. according to $2H_2+O_2 \rightarrow 2H_2O$ or $CH_3OH+1,5O_2 \rightarrow CO_2+2H_2O$).

An essential point of view is a possibly complete combustion and an optimization of the water balance of the entire system.

The invention claimed is:

1. A fuel cell device, comprising an electrolyte device which comprises an alkaline electrolyte and an acid electrolyte, wherein the fuel cell device is formed such that at least part of at least one reaction product produced at an electrolyte may be supplied to the other electrolyte.

2. A fuel cell device as claimed in claim 1, in which at least one reaction product produced at the one electrolyte may fully be supplied to the other electrolyte.

3. A fuel cell device as claimed in one of the preceding claim 1, in which the alkaline electrolyte comprises at least one anion-conducting portion, and the acid electrolyte comprises at least one cation-conducting portion.

4. A fuel cell device as claimed in claim 1, in which the acid electrolyte device comprises a plurality of cation-conducting portions.

5. A fuel cell device as claimed in claim 1, in which the alkaline electrolyte comprises a plurality of anion-conducting portions.

6. A fuel cell device as claimed in claim 3, in which anion-conducting portions and cation-conducting portions are arranged alternatingly.

7. A fuel cell device as claimed in claim 1, comprising a cathode device which comprises one single cathode chamber, and/or an anode device which comprises one single anode chamber.

8. A fuel cell device as claimed in claim 3, in which the electrolyte device is a coherent structure with locally different chemical composition, wherein portions of different chemical composition form the alkaline and acid portions.

9. A fuel cell device as claimed in claim 1, in which the electrolyte device comprises a membrane.

10. A fuel cell device as claimed in claim 2, comprising a cathode device which comprises one single cathode chamber, and/or an anode device which comprises one single anode chamber.

11. A fuel cell device as claimed in claim 3, comprising a cathode device which comprises one single cathode chamber, and/or an anode device which comprises one single anode chamber.

12. A fuel cell device as claimed in claim 6, comprising a cathode device which comprises one single cathode chamber, and/or an anode device which comprises one single anode chamber.

13. A fuel cell device as claimed in claim 6, in which the electrolyte device is a coherent structure with locally different chemical composition, wherein portions of different chemical composition form the alkaline and acid portions.

14. A fuel cell device as claimed in claim 7, in which the electrolyte device is a coherent structure with locally different chemical composition, wherein portions of different chemical composition form the alkaline and acid portions.

15. A fuel cell device as claimed in claim 2, in which the electrolyte device comprises a membrane.

16. A fuel cell device as claimed in claim 3, in which the electrolyte device comprises a membrane.

17. A fuel cell device as claimed in claim 6, in which the electrolyte device comprises a membrane.

18. A fuel cell device as claimed in claim 7, in which the electrolyte device comprises a membrane.

19. A fuel cell device as claimed in claim 8, in which the electrolyte device comprises a membrane.

\* \* \* \* \*